Figures 1, 2, 3:
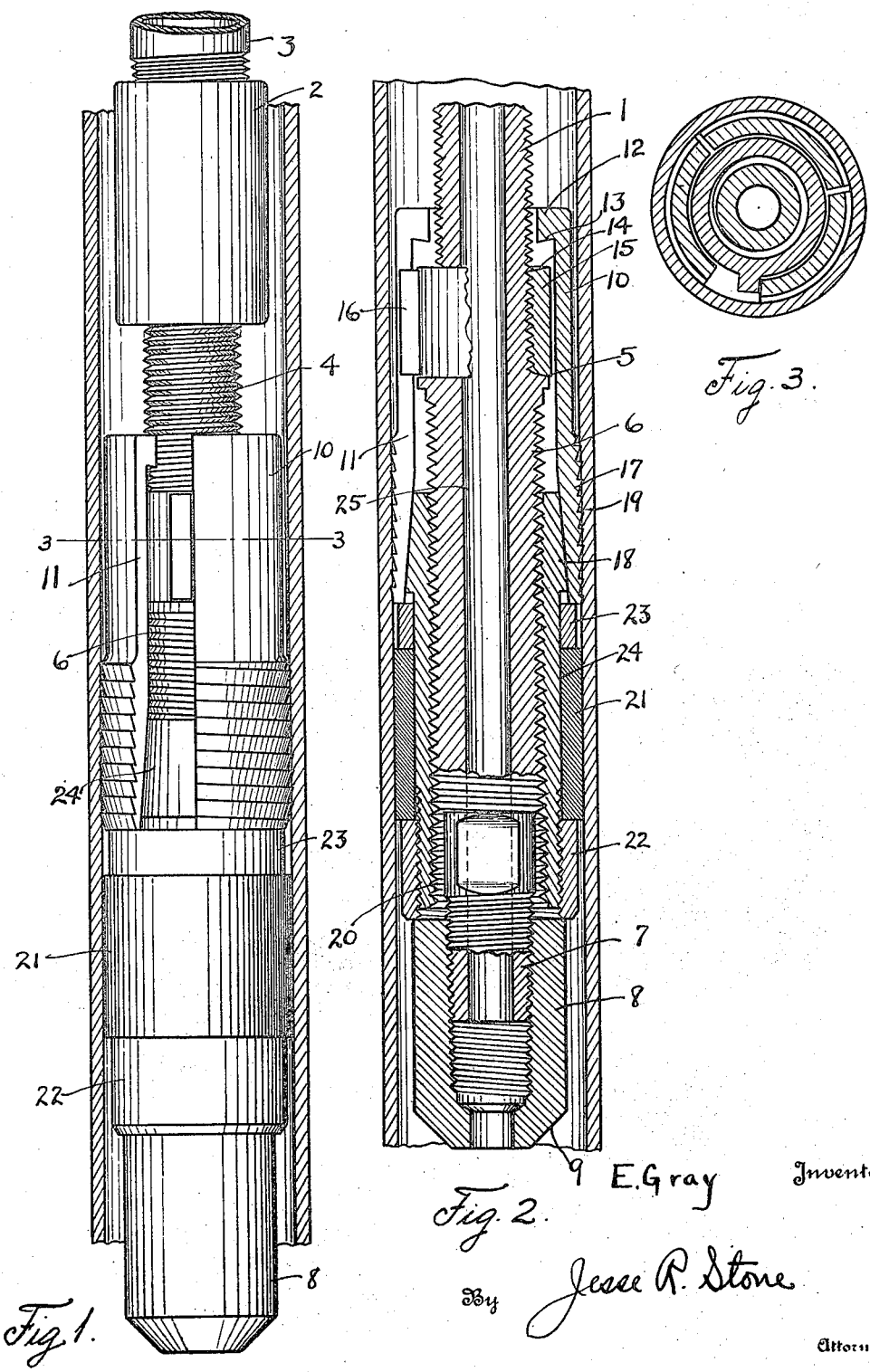

June 10, 1924.

E. GRAY

COMBINED FISHING TOOL AND PACKER FOR WELLS

Filed July 3, 1923

1,496,985

E. Gray Inventor

By Jesse R. Stone

Attorney

Patented June 10, 1924.

1,496,985

UNITED STATES PATENT OFFICE.

ELLSWORTH GRAY, OF HOUSTON, TEXAS.

COMBINED FISHING TOOL AND PACKER FOR WELLS.

Application filed July 3, 1923. Serial No. 649,329.

*To all whom it may concern:*

Be it known that I, ELLSWORTH GRAY, a citizen of the United States, residing at Houston, Harris County, Texas, have invented a certain new and useful Improvement in Combined Fishing Tools and Packers for Wells, of which the following is a full, clear, and exact description, such as will enable others skilled in the art to which it appertains to make and use the same.

My invention relates to a packer attachment to be employed on fishing tools of the bulldog or insert type, to be employed for gripping and removing pipe from deep wells in drilling and pumping operations.

It is an object of my invention to provide a packer attachment for fishing spears, whereby the flushing fluid may be forced downwardly through the pipe to be removed, so that the said pipe may be washed loose when it becomes stuck in the hole.

It is another object of my invention to provide a packer which may be employed on an ordinary drill stem, to provide an attachment between said drill stem and a large size of casing, and to shut off the passage of fluid between said drill stem and casing, so that the well may be tested to ascertain whether it will flow through the smaller size of pipe.

It is another object to provide a combined spear and packer which may be used on an ordinary type of drill stem to seal off the space between the drill stem and casing to test whether one casing is leaking and, if so, at about what level. Devices of this nature must be releasable, and it is desired that the packer and spear thus provided shall be capable of positive release when it is desired to withdraw the tool from the well. This and the other objects and advantages will be more clearly set forth in the specification which follows.

Referring to the drawing, wherein the preferred embodiment of my invention is disclosed, Fig. 1 is a central longitudinal section through a piece of pipe showing my tool in elevation therein. Fig. 2 is a central longitudinal section through the operative portion of my device; and Fig. 3 is a transverse section on the plane 3—3 of Fig. 1.

In carrying out my invention, I contemplate using a fishing spear such as is disclosed in my prior Patent No. 1,414,511, granted May 2nd, 1922, and to form, in connection with a tool of this character, a packer which may be positively expanded or contracted as desired in the operation of the spear.

In the drawing, I have shown a spear made up of a central shaft 1, connected by means of a special coupling 2 to the operating pipe or drill stem 3. The shaft 1 is threaded on its upper portion at 4 in a right hand direction, the said righthand thread extending downwardly on said shaft to a central shoulder 5. Below said shoulder, the shaft is threaded at 6 in a lefthand direction. The lower end of the shaft is reduced in diameter at 7 and threaded in a righthand direction for the attachment of a nut 8, which is beveled at the lower end at 9, said nut acting also as a guide member while introducing the tool into the well.

On the upper portion of the shaft 1 is mounted a slip 10, which comprises a sleeve surrounding the shaft and split as shown at 11 on one side thereof so as to allow the ready expansion of the slip. The sleeve is spaced outwardly from the shaft 1 and has an inwardly projecting flange 12 at the upper end. This flange has a downwardly beveled shoulder 13 on the lower side thereof to contact with a similar shoulder 14 on the upper end of an operating nut 15 threaded upon the righthand portion 4 of the shaft. On one side of the nut 15 is a radially projecting flange or wing 16, adapted to project outwardly through the slit 11 in the slip 10. The lower portion of the slip 10 is provided with teeth 17 which are directed upwardly to seize the pipe which is to be gripped by the spear.

The lower end of the slip 10 is flared outwardly to fit over a tapered mandrel 18, which is made in the form of a sleeve threaded upon the lower lefthand threaded portion 6 of the shaft. The movement of the said slip toward the mandrel will, therefore, tend to expand said slip outwardly into contact with the pipe 19 which is to be gripped by the tool. The sleeve 18, constituting the mandrel, is extended downwardly a short distance below the threaded end of the section 6 of the shaft, as shown particularly in Fig. 2, thereby providing a chamber 20 between the shaft and the inner threaded face of the mandrel.

My packer attachment for the spear is mounted below the spear 10 upon the outer face of the mandrel 18. Said packer comprises a central sleeve 21 of compressible material, such as fabric impregnated with rubber or other similar wear-resisting composition. This sleeve rests at its lower end upon a nut 22, screwed upon the lower end of the mandrel. Said packer is separated from the lower end of the slip 10 by means of a sliding ring 23 fitting over the lower portion of the mandrel. The seat 24 for the packing sleeve and the sliding ring 23 upon the mandrel is cylindrical as shown in Fig. 2.

In the operation of this device, it may be supposed that a piece of pipe or tubing 19 has been broken off and left standing in the bottom of the well. In such case, the spear will be connected at the lower end of a piece of pipe 3, which may, under ordinary circumstances, be the drill stem, and the tool will be thus lowered downwardly into the well. When thus inserted into the well, the slip 10 and the packer will be in contracted position and the slip will be forced upwardly along the tapered mandrel and will not, therefore, grip the side of the casing. When the tool has been inserted downwardly into the upper end of the broken pipe 19 and the tool is then drawn upwardly, the contact of the teeth 17 with the inner surface of the pipe 19 will draw it downwardly on the mandrel 18, causing it to automatically expand outwardly and grip the pipe firmly. As the spear 17 is thus moved downwardly on the mandrel, the lower end will contact with the ring 23 above the packer and force it downwardly against the packer, compressing it longitudinally and thus forcing it into expanded position, completely packing off the space between the spear and the inner wall of the pipe. A continued upward pull upon the spear will tend to pull the pipe 19 upwardly and thus remove it from the well. It sometimes happens that the pipe 19 is embedded in sand or that pebbles or other débris has fallen in around the outer face of the said pipe so as to cause it to become lodged in the well. It may be loosened under those circumstances after the packer has been expanded by pumping downwardly through the passage 25 in the tubular shaft. This fluid thus forced in under pressure will not be able to escape upwardly between the spear and the pipe 19 and hence will be forced downwardly through said pipe 19 and upwardly outside thereof. When the pumps have been worked for a period, allowing the flushing fluid to wash the sand and other matter lodging about the pipe 19 away to the surface, the pipe will be thus loosened so that it may be withdrawn from the well with the spear. It will thus be noted that the packer attachment to the spear allows the same to be used in washing the pipe free from the well when it would otherwise be securely held against removal. The obvious advantages of this feature are of especial value in fishing operations.

If it is found that the pipe 19 is securely held in the well and cannot be washed loose and thus removed, it will be possible to release the spear and the packer and withdraw the tool from the pipe, leaving the pipe in the well. This operation will be performed by rotating the shaft 1 in a righthand direction. The slip 10 will be securely held against the wall of the pipe and by rotating the shaft 1, the nut 15 will be drawn upwardly on the threaded portion 4 into contact with the shoulder 13 at the upper end of the slip 10. At the same time, the rotation of the shaft will screw the sleeve 18, constituting the mandrel, downwardly thereon until the lower end thereof contacts with the upper end of the nut 8. The continued rotation of the drill stem thereafter will cause the nut 15 to draw the slip 10 upwardly and the slip and mandrel will thus be forced apart, so that the slip may contract and be positively released from its grip upon the pipe. When the pressure is thereby released from the packer 21, it will automatically contract and may be withdrawn from the well.

The tool thus provided may be employed in various emergencies connected with drilling and pumping operations. It may be attached to the end of a drill stem, which is always available upon a drilling rig, to test whether a newly finished well will flow through a pipe of comparatively small diameter. This is of value where a well has been completed with a large size casing and where the gas pressure is insufficient to raise the oil through a pipe of such a large diameter. The smaller drill stem is provided with a packer slip of this construction on the lower end thereof and is introduced downwardly into the lower end of the casing and there expanded to close the space between the spear and the inner wall of the casing so that the gas pressure in the bottom of the well will thereby be exerted entirely upon the fluid within the smaller pipe attached to the spear. If it is found that the pressure is sufficient to force the fluid upwardly through the smaller pipe, it may be left in the well to furnish an outlet for the flowing fluid, or it may be detached and withdrawn and a smaller pipe and packer introduced in place of the apparatus previously described. It will be obvious that this device may be used for other purposes in the operation of oil well drilling and pumping and, as an example, may be employed to test whether a casing is leaking, by packing off the space between the drill stem and the casing and testing whether the water enters the casing above or below the packer, and this may be done at any desired level in the well.

While I have shown one particular embodiment of my invention, it is obvious that different constructions may be employed without departing from the spirit of my invention. The use upon the shaft 1 of a right-hand thread for the slip and a left-hand thread for the mandrel whereby they may be forced in opposite directions may be varied by the use of only one of these threaded portions. If the mandrel is forced downwardly while the jaws are held stationary, it is obvious that the device may be contracted in the same manner and with only a small loss of time. Various other changes may be made, all coming within the scope of my invention.

What I claim as new and desire to protect by Letters Patent is:

1. In a device of the character described, a threaded shaft having an upper right-hand threaded portion and a lower left-hand threaded portion, a nut on the upper portion, a slip non-rotatable relative to said nut, an upwardly tapered mandrel on said lower portion on which said slip is formed to fit, a packer on said mandrel below said slip and adapted to be expanded by said slip, said slip and mandrel adapted to be forced apart and said packer released by the rotation of said shaft.

2. In a device of the character described, a threaded shaft, an upwardly tapered mandrel thereon, an expanding slip on said mandrel, a nut on said shaft non-rotatable relative to said slip, a packing sleeve on said mandrel below said slip, means to support said sleeve on said mandrel, whereby it may be expanded by said slip, and means including said nut for releasing said slip and packer.

3. In a device of the character described, a threaded shaft, an upwardly tapered mandrel screwed thereon having a lower cylindrical portion, an expanding toothed slip on said tapered portion and a compressible packing sleeve on said cylindrical portion of said mandrel, said slip being adapted to be forced downwardly to expand said slip and to compress and expand said packer, and means to thereafter contract and release said slip and packer.

4. In a device of the character described, a shaft, an upwardly tapered mandrel screwed thereon, a toothed expanding slip on said mandrel, a compressible packing sleeve on said mandrel below said slip adapted to be compressed and expanded by the downward movement of said slip and means to force said slip upwardly on said mandrel for the purpose described.

5. In a device of the character described, a threaded shaft, a tapered mandrel screwed thereon, a toothed expanding slip on said mandrel, a compressible packing means below said slip and adapted to be compressed longitudinally and expanded by the downward movement of said slip and means to force said slip upwardly to release said packer, actuated by the rotation of said shaft.

6. In a device of the character described, a threaded shaft, a mandrel, threaded on the lower portion thereof, a nut screwed upon the upper portion thereof, an expanding slip engaging above said nut and fitting on said mandrel, a packing sleeve on said mandrel below said slip adapted to be compressed thereby and means to hold said nut non-rotatable relative to said slip whereby the rotation of said shaft will force said slip and said mandrel apart to release said packer.

7. In a device of the character described, a shaft, an upwardly tapered mandrel thereon, an expanding slip on said mandrel, a packing sleeve below said slip adapted to be compressed thereby, and means to force said slip and mandrel apart to release said slip and packer, actuated by the rotation of said shaft.

8. In a device of the character described, a shaft, a slip thereon having teeth adapted to engage within a pipe, means to expand said slip as it is moved downwardly on said shaft, a packer below said slip adapted to be expanded by said slip, and means to move said shaft relative to said slip to release the same and allow the contraction of said packer.

In testimony whereof, I hereunto affix my signature, this the 28 day of June, A. D. 1923.

ELLSWORTH GRAY.